Dec. 5, 1950     C. R. DALE     2,533,097
UNION AND EXPANSION JOINT
Filed Sept. 15, 1944
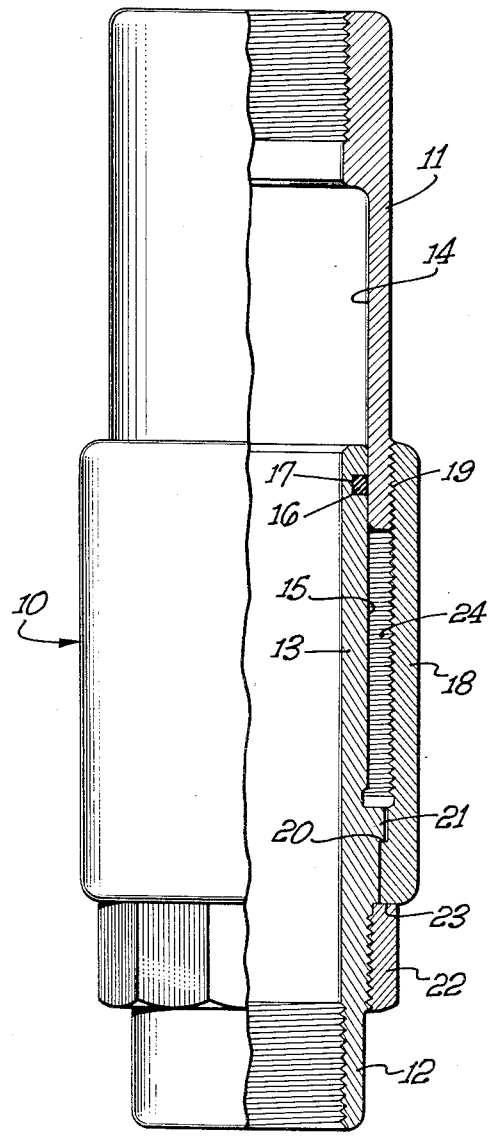
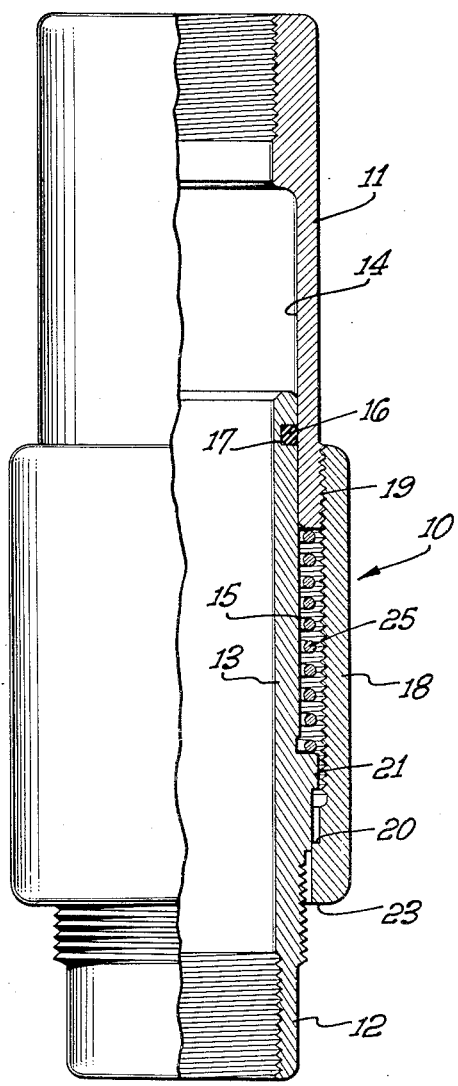
CLARENCE R. DALE,
INVENTOR.
BY
ATTORNEY.

Patented Dec. 5, 1950

2,533,097

UNITED STATES PATENT OFFICE 2,533,097

UNION AND EXPANSION JOINT

Clarence R. Dale, Altadena, Calif.

Application September 15, 1944, Serial No. 554,251

9 Claims. (Cl. 285—199)

This invention has to do generally with pipe joints, and relates particularly to an improved joint structure adaptable for use either or both as a relatively wide take-up union and as an expansion joint.

One of my primary objects is to interconnect two relatively axially or telescopically movable pipe sections in a manner effectively sealing them against fluid leakage at the joint, and permitting their telescopic take-up over a substantial range of relative movement in assembling the joint to an initial or made-up condition.

A further object is to adapt the joint thus initially made-up for further telescopic movement of the sections, as in response to expansion of connected pipe lengths, thereby giving the joint the dual characteristics of a union and an expansion joint.

The manner of accomplishing these objects and the details of a typical and preferred embodiment of the invention will be fully understood from the description to follow. Reference is had to the accompanying drawing, in which:

Fig. 1 is a sectional view of the joint rigidly made-up as a union; and

Fig. 2 is a similar view illustrating a variational feature and the use of the invention as an expansion joint.

The joint, generally indicated at 10, interconnects a pair of pipe sections 11 and 12, the outer ends of which may be adapted for any suitable type and form of pipe connections. The two sections 11 and 12 are maintained in fluid-tight telescopic relation by the reception of the inner cylindrical end portion 13 of section 12 within the bore 14 of section 11. Preferably the wall of the bore 14 is given a honed finish to close tolerance, and the outer surface 15 of the companion section also is accurately finished (a plated finish sometimes being used) to maintain a closely fitted sliding contact between the overlapping surfaces 14 and 15. Fluid leakage between the sections is prevented by the normally circular cross-section rubber O ring packing 16 contained within annular recess 17 in the pipe section 12 and bearing against the bore surface 14. This type of packing in the arrangement shown is particularly effective to seal the joint against fluid leakage even at extremely high pressures.

The section 12 carries a sleeve nut 18 threaded at 19 on section 11 and having a shoulder 20 adapted to be turned tightly against the flange 21 to make-up the joint as a rigid union. In this condition the sleeve is held against loosening, by nut 22 threaded on the section 12 and bearing at 23 against the end of the sleeve. It will be observed that the sleeve 18 has considerable internally threaded length, permitting therefore considerable and corresponding variation or take-up in the end-to-end relationship of the two pipe sections being joined. Thus whereas the drawing shows a relatively short overlap between the sealed ends of the sections, it will be apparent that their range of adjustment permits telescopic advancement of the section 11 about section 12 to the point of engagement with the flange 21.

As previously observed, the joint may function as an expansion joint to permit further movement together of the pipe sections 11 and 12. For this purpose, the nut 22 may be loosened to permit limited relative telescopic movement of the sections, or it may in effect be entirely removed, see Fig. 2. With the sleeve 18 thus freed for movement relative to the section 12, the sections are permitted to telescope further together in response, for example, to expansion of pipes to which they are connected. Subsequently, normal contraction of the pipes or internal fluid pressure may restore the joint to the condition in which the flange 21 is engaged against the sleeve shoulder 20.

If for any reason, as in the absence of such influences, it is desired to assure restoration of the joint to its expanded condition, a coil spring 25 confined within the annular space 24 between the end of pipe 11 and shoulder 21, may be used to expand and restore the joint to the assumed normal condition illustrated.

I claim:

1. A joint of the character described, comprising first and second tubular sections having, respectively, outer and inner telescopically arranged end portions with engaging cylindrical surfaces, sealing means between said end portions, and a sleeve nut carried by said second section and engaged with exterior threads on said first section, said sections being relatively axially movable together to an initial made-up position by rotation of said sleeve nut, and the sections thereafter being movable relatively together beyond said initially made-up position, and a spring between said sections resisting their relative movement together.

2. A fluid conducting pipe joint comprising first and second tubular pipe sections having substantially unobstructed bores and having, respectively, outer and inner telescopically arranged first end portions with engaging cylindrical surfaces, annular sealing means carried by one of said end portions and engaging and slidable along the cylindrical surface of the other of said end portions in the same condition at all relative axial positions of the sections, said sections having outer second end portions threaded for attachment to a pair of conduits, and a sleeve nut carried by said second section and engaged with exterior threads on said first section, said sections being relatively axially movable together by rotation of said sleeve nut.

3. A fluid conducting pipe joint comprising first and second tubular pipe sections having substantially unobstructed bores and having, respectively, outer and inner telescopically arranged first end portions with engaging cylindrical surfaces, sealing means between said end portions comprising an annular rubber ring of circular cross-section seated in a recess in said inner end portion and engaging and slidable along the bore wall of said outer end portion in the same condition at all axial positions of said sections, said sections having outer second end portions threaded for attachment to a pair of conduits, and a sleeve nut carried by said second section and engaged with exterior threads on said first section, said sections being relatively axially movable together by rotation of said sleeve nut.

4. A fluid conducting pipe joint, comprising first and second tubular pipe sections, having substantially unobstructed bores and having, respectively, outer and inner telescopically arranged first end portions with engaging cylindrical surfaces, annular sealing means carried by one of said end portions and engaging and slidable along the cylindrical surface of the other of said end portions in the same condition at all relative axial positions of the sections, said sections having outer second end portions threaded for attachment to a pair of conduits, and a sleeve nut carried by said second section and engaged with exterior threads on said first section said sections being relatively axially movable together to a made-up position by rotation of said sleeve nut, and means releasably retaining said sleeve against axial movement in either direction relative to said second section.

5. A fluid conducting pipe joint, comprising first and second tubular pipe sections having substantially unobstructed bores and having, respectively, outer and inner telescopically arranged first end portions with engaging cylindrical surfaces, annular sealing means carried by one of said end portions and engaging and slidable along the cylindrical surface of the other of said end portions in the same condition at all relative axial positions of the sections, said sections having outer second end portions threaded for attachment to a pair of conduits, a sleeve nut carried by said second section and engaged with exterior threads on said first section, said sections being relatively axially movable together to a made-up position by rotation of said sleeve nut, and a retaining nut threaded on said second section independently of said threads at the outer end thereof and engaging said sleeve nut.

6. A fluid conducting pipe joint, comprising first and second tubular pipe sections having substantially unobstructed bores and having, respectively, outer and inner telescopically arranged first end portions with engaging cylindrical surfaces, annular sealing means carried by one of said end portions intermediate the ends of said cylindrical surface on that portions and engaging and slidable along the cylindrical surface of the other of said end portions in the same conditions at all relative axial positions of the sections, said sections having outer second end portions threaded for connection to a pair of conduits, means forming a shoulder integral with said second section, a sleeve nut carried by said second section and engaging said shoulder, said nut being engaged with exterior threads on said first section so that the sections are relatively axially movable to a made-up position by rotation of said sleeve nut, and a retaining nut threaded on said second section independently of said threads at the outer end thereof and engaging the sleeve nut to prevent movement thereof away from said shoulder.

7. A fluid conducting pipe joint, comprising first and second tubular pipe sections having substantially unobstructed bores and having, respectively, outer and inner telescopically arranged first end portions with engaging cylindrical surfaces, sealing means between said end portions comprising an annular rubber ring of circular cross-section seated in a recess in said inner end portion intermediate the ends of said cylindrical surface on the inner end portion and engaging and slidable along the cylindrical surface of the outer end portion in the same condition at all axial positions of said sections, said sections having outer box ends internally threaded for connection to a pair of conduits, means forming a shoulder integral with said second section, a sleeve nut carried by said second section and engaging said shoulder, said nut being engaged with exterior threads on said first section so that the sections are relatively axially movable to a made-up position by rotation of said sleeve nut, and a retaining nut threaded onto the outside of said second section and engaging the sleeve nut to prevent movement thereof away from said shoulder, said retaining nut being removable from said sections to permit relative movement together of said sections beyond said made-up position.

8. A fluid conducting pipe joint, comprising first and second tubular pipe sections having substantially unobstructed bores and having, respectively, outer and inner telescopically arranged first end portions with engaging cylindrical surfaces, annular sealing means carried by one of said end portions intermediate the ends of said cylindrical surface on that portion and engaging and slidable along the cylindrical surface of the other of said end portions in the same condition at all relative axial positions of the sections, said sections having outer second end portions threaded for attachment to a pair of conduits, and a sleeve nut carried by said second section and engaged with exterior threads on said first section, said sections being relatively axially movable together to an initial made-up position by rotation of said sleeve nut, and the sections thereafter being movable relatively together beyond said initially made-up position.

9. A fluid conducting pipe joint, comprising first and second tubular pipe sections having substantially unobstructed bores and having, respectively, outer and inner telescopically arranged first end portions with engaging cylindrical surfaces, annular sealing means carried by one of said end portions and engaging and slidable along the cylindrical surface of the other of said end portions in the same condition at all relative axial positions of the sections, said sections having outer box ends internally threaded for attachment to a pair of conduits, a sleeve nut carried by said second section and engaged with exterior threads on said first section, said sections being relatively axially movable together to a made-up position by rotation of said sleeve nut, and a retaining nut threaded onto the outside of said second section to engage and position said sleeve nut.

CLARENCE R. DALE.

REFERENCES CITED

The following references are of record in the file of this patent:

UNITED STATES PATENTS

| Number | Name | Date |
|---|---|---|
| 338,599 | Hughes | Mar. 23, 1886 |
| 553,509 | Burnham | Jan. 28, 1896 |
| 874,652 | Bailey | Dec. 24, 1907 |
| 1,191,503 | Ford | July 18, 1916 |
| 1,563,836 | Copp | Dec. 1, 1925 |
| 1,970,059 | Schotter | Aug. 14, 1934 |

FOREIGN PATENTS

| Number | Country | Date |
|---|---|---|
| 283,811 | Great Britain | Jan. 19, 1928 |
| 131,906 | Austria | Sept. 15, 1932 |
| 393,419 | Great Britain | June 8, 1933 |